(12) United States Patent
Van Niekerk et al.

(10) Patent No.: US 12,638,357 B2
(45) Date of Patent: May 26, 2026

(54) TOILET LEAK DETECTION DEVICE AND METHOD

(71) Applicant: Connected Sensors LLC, Woodbridge (CA)

(72) Inventors: Johann Van Niekerk, St. Thomas (CA); Simon Brunet, Mississauga (CA)

(73) Assignee: Connected Sensors LLC, Woodbridge (CA)

( * ) Notice: Subject to any disclaimer, the term of this patent is extended or adjusted under 35 U.S.C. 154(b) by 224 days.

(21) Appl. No.: 18/641,327

(22) Filed: Apr. 19, 2024

(65) Prior Publication Data

US 2025/0327711 A1     Oct. 23, 2025

(51) Int. Cl.
| | |
|---|---|
| *G01M 3/04* | (2006.01) |
| *E03D 1/32* | (2006.01) |
| *E03D 11/13* | (2006.01) |

(52) U.S. Cl.
CPC ................. *G01M 3/04* (2013.01); *E03D 1/32* (2013.01); *E03D 11/13* (2013.01)

(58) Field of Classification Search
CPC ............................... G01M 4/04; G01M 11/13
USPC .......................................................... 4/314
See application file for complete search history.

(56) References Cited

U.S. PATENT DOCUMENTS

| | | | | |
|---|---|---|---|---|
| 7,362,230 | B1* | 4/2008 | Fish ........................ | G01M 3/04 |
| | | | | 73/40 |
| 2014/0053329 | A1* | 2/2014 | Schuster ................. | G01F 23/56 |
| | | | | 4/314 |
| 2015/0323412 | A1* | 11/2015 | Stoltz ..................... | G01M 3/28 |
| | | | | 700/282 |
| 2017/0356559 | A1* | 12/2017 | Ehsani ..................... | E03D 1/36 |
| 2018/0320355 | A1* | 11/2018 | Biermann ............... | E03D 11/13 |
| 2023/0228075 | A1* | 7/2023 | Gunawardena ......... | E03D 1/087 |
| | | | | 4/368 |

* cited by examiner

*Primary Examiner* — Huyen D Le
(74) *Attorney, Agent, or Firm* — Orin Del Vecchio

(57)     ABSTRACT

A toilet leak detection device and method wherein the present invention is configured to be operably coupled to the water supply of a toilet and provide monitoring of leak conditions thereof. The present invention includes a control assembly that is operably coupled to the water supply pipe for a toilet. The control assembly includes a valve that is movable between an on/off position so as to control water flow into the toilet. A detection module is present to provide detection of a user adjacent to the toilet. A leak detection module and at least one remote sensor are utilized to detect wet/dry conditions for the area of the floor adjacent to the toilet. The method of the present invention employs utilizing a timeout period controlled by the processing module of the control assembly to inhibit operation of the valve and detection module for a programmed time period.

8 Claims, 3 Drawing Sheets

TOILET LEAK DETECTION DEVICE AND METHOD

FIELD OF THE INVENTION

The present invention relates generally to leak detection systems, more specifically but not by way of limitation, a water leak system that is operably coupled to a toilet supply line wherein the present invention provides control of the water supply to the toilet and further provides leak detection at the base of the toilet.

BACKGROUND

Homeowners are highly likely to experience water damage at some point in their lives. According to certain studies water damage affects around 14,000 people in the United States every single day. If a toilet leaks when its flushed, chances are the problem is either a faulty toilet fill valve or the wax seal that forms a seal between the toilet and the sewer line. Prompt identification of the problem and implementing a solution to resolve can save the property owner a significant amount of money. A leaking toilet can consume up to two hundred gallons per day. Depending on the source of the leak, additional damages can occur to the structure in which the toilet is mounted.

If the wax seal is the source of the problem, water will most likely egress onto the floor which can cause significant damage costing tens of thousands of dollars. Indicators of a faulty wax seal are typically parameters such as but not limited to water at the base of the toilet. A toilet wax ring creates a watertight seal between the sewer pipe and the bottom of the toilet. Toilet leaks can account for more than ten thousand gallons of water wasted every year per household. Household leaks can waste more than one trillion gallons annually across North America. This water leakage volume is an amount equal to the annual household water use of more than eleven million homes.

Accordingly, there is a need for a toilet leak detection system that provides control of the water flow to a toilet and further includes leak detection modules proximate the base of the toilet so as to inhibit water flow into the toilet subsequent detection of a leak.

SUMMARY OF THE INVENTION

It is the object of the present invention to provide a water control and leak detection device for a toilet wherein the present invention is operably coupled to the water supply line for the toilet.

Another object of the present invention is to provide a device operable to provide water flow control and leak detection for a toilet wherein the present invention includes a solenoid valve that is activated provide water flow to the toilet for a programmed time period ensuing detection of a user.

A further object of the present invention is to provide a water control and leak detection device for a toilet wherein the method of the present invention utilizes a step of employing a magnet to initiate activation of the device during installation thereof.

Yet a further object of the present invention is to provide a device operable to provide water flow control and leak detection for a toilet wherein the present invention includes at least one remote sensor on the floor proximate the toilet.

Still another object of the present invention is to provide a water control and leak detection device for a toilet wherein the method of the present invention employs a step of controlling the water flow to the toilet for a programmed time period.

An additional object of the present invention is to provide a device operable to provide water flow control and leak detection for a toilet wherein the present invention further includes a timeout timing module that inhibits operation of the solenoid valve and detection of a user for a programmed time period.

Yet a further object of the present invention is to provide a water control and leak detection device for a toilet wherein the present invention further includes an alarm module which can provide visual, audial and remote alarms to an operator of the present invention.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
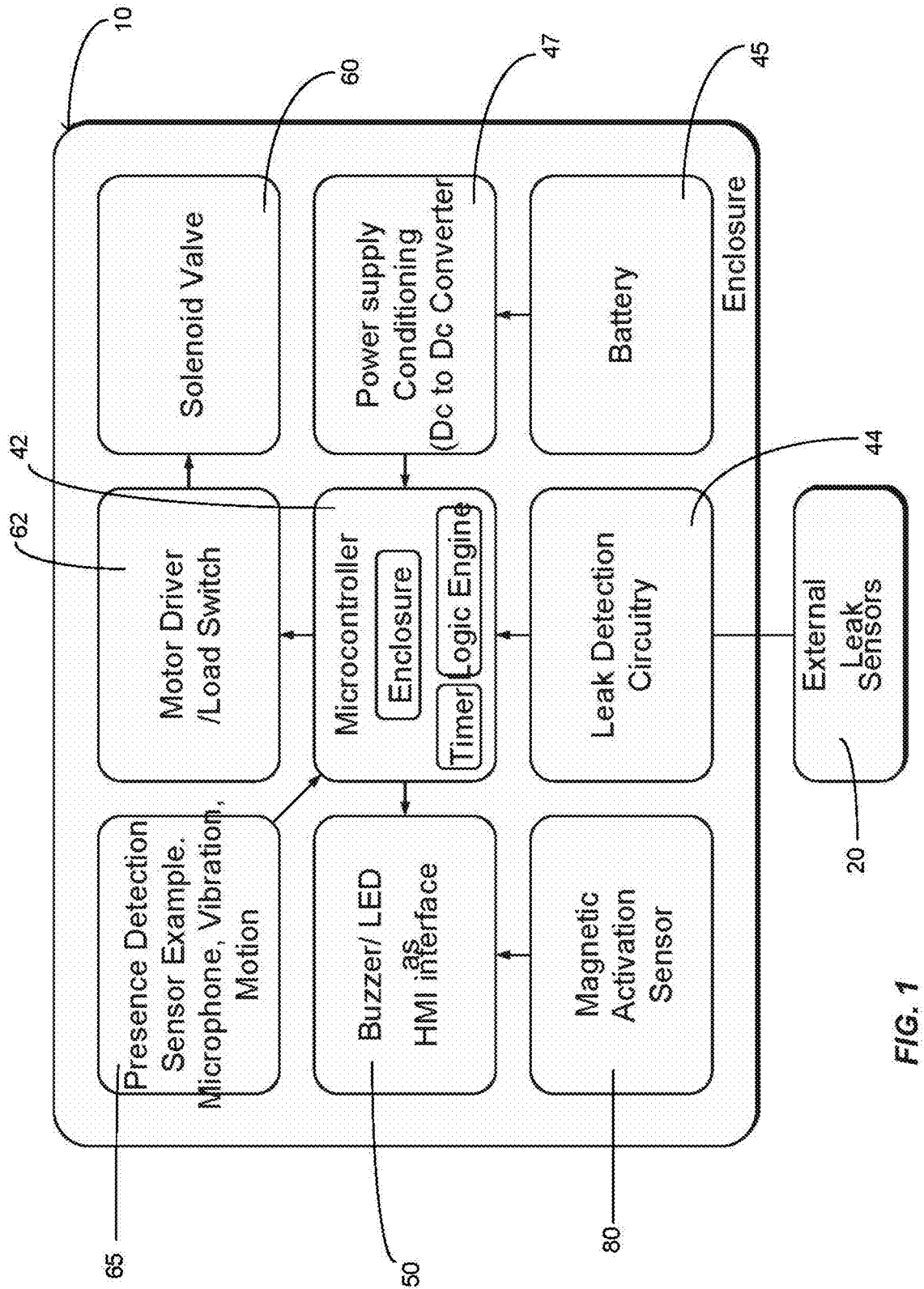
FIG. 1 is a block diagram of the control assembly of the present invention.
Figure 2:
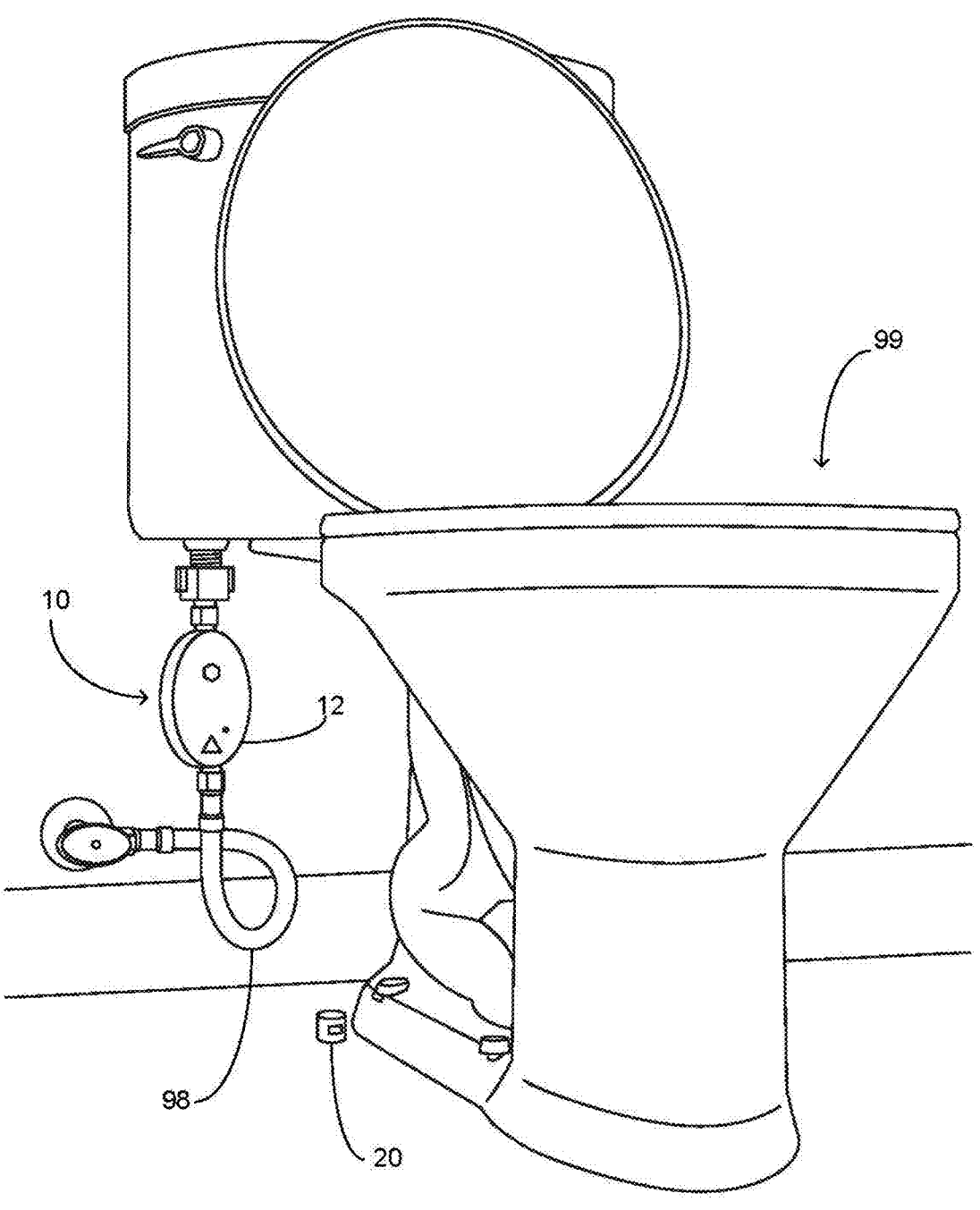
FIG. 2 is a perspective view of the present invention operably coupled to an exemplary toilet.

Referring now to the drawings submitted herewith, wherein various elements depicted therein are not necessarily drawn to scale and wherein through the views and figures like elements are referenced with identical reference numerals, there is illustrated a toilet leak detection device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the toilet leak detection device 100 is configured to be operably coupled to exemplary toilet 99 wherein the present invention provides control of water flow thereto and further provides monitoring of areas proximate to the toilet 99 for presence of water. The toilet leak detection device 100 includes control assembly 10 wherein the control assembly 10 is operably coupled to the exemplary toilet 99 via conventional plumbing 98. As is further discussed herein the control assembly 10 includes elements that provide functions such as but not limited to water flow control to the toilet 98, monitoring of the presence of water and providing an alarm upon detection of water. The control assembly 10 includes a housing 12 manufactured from a suitable durable material such as but not limited to plastic. It should be understood within the scope of the present invention that the housing 12 could be manufactured in alternate sizes and shapes so as to house the elements disposed therein that are further subsequently discussed herein The toilet leak detection device 100 includes a remote sensor 20. The remote sensor 20 is configured to be placed proximate the toilet 98 and is operable to detect the presence of water. The remote sensor 20 is communicably coupled to the control assembly 10 and is configured to transmit a signal thereto. Subsequent detection of water, the remote sensor 20 transmits a signal to the leak detection module 44. It should be understood within the scope of the present invention that the remote sensor 20 employs two metals that have a different expansion rate upon exposure to water. Ensuing water contacting the two metals, the remote sensor 20 will transmit a signal to the leak detection module 44. It should further be understood within the scope of the present invention that the remote sensor 20 could employ alternate types of technology operable to detect the presence of water.

The control assembly 10 includes processing module 42 wherein the processing module 42 includes the necessary electronics to receive, store, transmit and manipulate data. The processing module 42 provides the operation of the control assembly 10 as is discussed herein. The control assembly 10 is powered via power source 45 wherein the power source 45 can be a conventional lithium ion battery or other suitable power source. In a preferred embodiment of the present invention the power source 45 has a power conditioner 47 operably intermediate the power source 45 and the processing module 42. In a preferred embodiment of the present invention the control assembly 10 has a power conditioner 47 that is a converter of direct current from a first voltage to a second voltage. It should be understood within the scope of the present invention that the present invention could be provided without a power conditioner 47.

Disposed within the housing 12 of the control assembly 10 is a leak detection module 44. The leak detection module 44 is operably coupled to the remote sensor 20. It is contemplated within the scope of the present invention that the remote sensor 20 is operably coupled utilizing suitable techniques such as but not limited to wired or wireless connections. The leak detection module 44 is configured to receive signals from the remote sensor 20 in the event of detection of water by the remote sensor 20. The leak detection module 44 is operably coupled to the processing module 42 and is configured to receive and process signals therefrom. Ensuing receipt of a signal from the leak detection module 44, the processing module 42 transmits a signal to the alarm module 50. It should be understood within the scope of the present invention that the alarm module 50 is operable to emit audio and visual alarm, wherein the alarm provides alert of the detection of water by the remote sensor 20.

The control assembly 10 further includes a solenoid valve 60 that is operably coupled to driver module 62. The solenoid valve 60 is a conventional on-off valve where, as is further discussed herein, is operable to control the water supply to the toilet 99. A detection module 65 is present in the control assembly 10. Detection module 65 is operably coupled to the processing module 42 and is configured to transmit a signal thereto ensuing detection of a user proximate the toilet 99. It should be understood within the scope of the present invention that the detection module 65 could employ technology such as but not limited to passive infrared technology to facilitate the detection of the presence of a user proximate the toilet 99. An activation module 80 is disposed within the housing 12 of the control assembly 10. As is further discussed herein, the activation module 80 is employed during installation of the toilet leak detection device 100 to provide activation thereof. In a preferred embodiment of the present invention, the activation module 80 employs technology such as but not limited to magnet technology to provide operation thereof.

Figure 3:
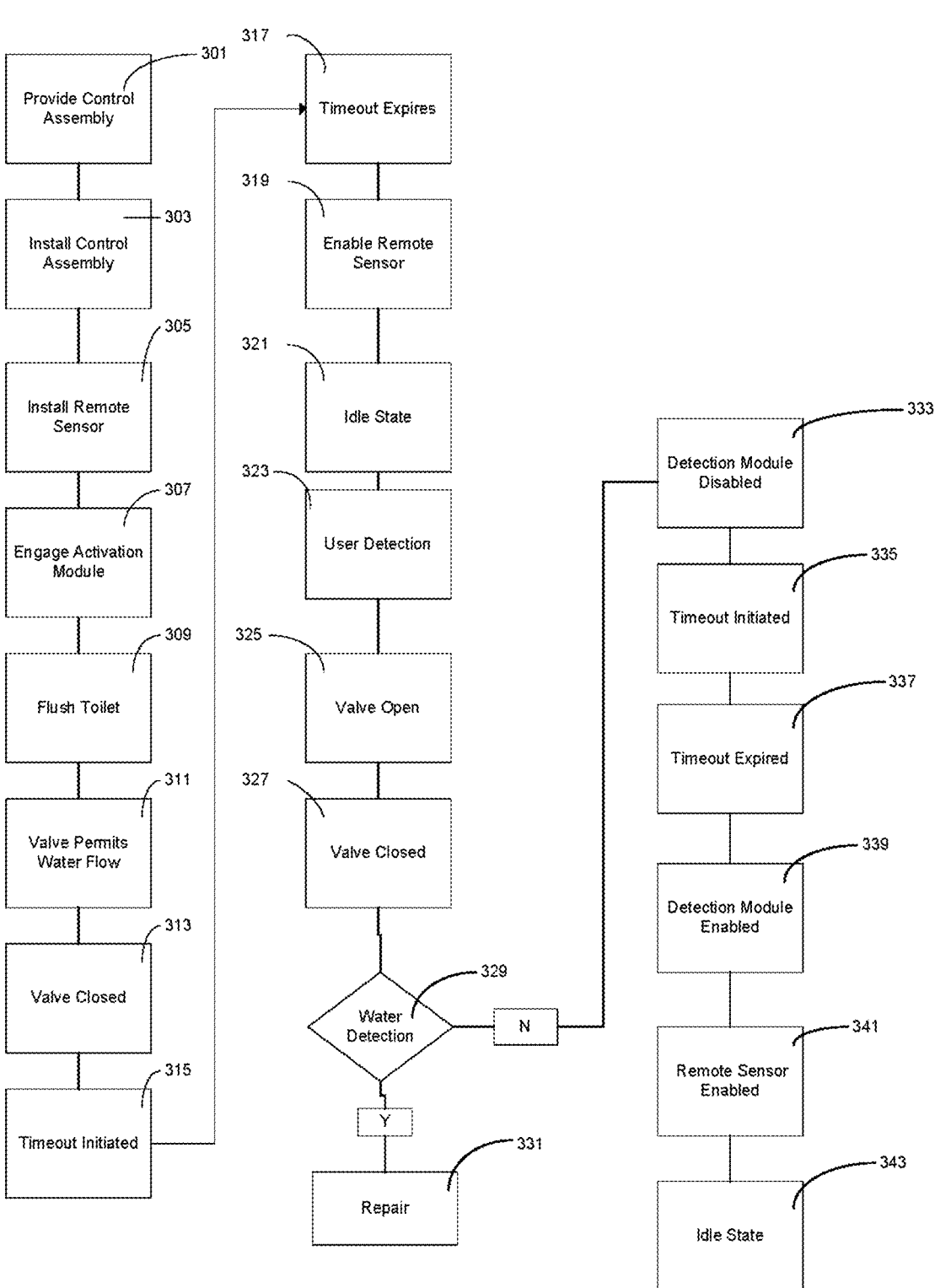
FIG. 3 is a flowchart of the method of the present invention.

Referring now to FIG. 3 submitted as a part hereof, the method of the present invention is diagrammed therein. It should be understood within the scope of the present invention that the order of the following method steps are exemplary and changes in the order are contemplated within the scope of the present invention. Furthermore, it should be understood within the scope of the present invention that some steps could be eliminated and the method of the present invention could still be executed as intended. In step 301, a control assembly 10 is provided to a user to be operably coupled to a toilet 99. Step 303, the control assembly 10 is operably coupled to the exemplary toilet 99 utilizing the appropriate tools wherein the control assembly 10 is fluidly coupled to the water supply and the toilet 99. In step 305, at least one remote sensor 20 is installed and paired with the control assembly 10. It should be understood within the scope of the present invention that the remote sensor 20 could be installed proximate one or both sides of the toilet 99. Additionally, it is further contemplated within the scope of the present invention that a remote sensor 20 could be placed underneath a sink basin proximate the toilet 99 for monitoring thereof in addition to monitoring of the area adjacent the toilet 99.

Step 307, the activation module 80 is activated so as to place the toilet leak detection device 100 in an operative state. In a preferred embodiment the activation module 80 is activated with a magnet activation key, it should be understood within the scope of the present invention that the activation module 80 could be activated utilizing various suitable techniques. In step 309, the user will perform a flush of the toilet 99 to ensure the control assembly 10 has been properly installed and no leaks are present. Step 311, once in operational mode the valve 60 is placed in the on position wherein in this position water is permitted to flow into the toilet 99. In a preferred embodiment of the present invention, the valve 60 is placed in the open position to permit water to flow into the toilet 99 for a time period of thirty to sixty seconds. It is contemplated within the scope of the present invention that the time period of thirty to sixty seconds could be changed to a time range greater or less than the preferred time period. In step 313, ensuing water flowing into the toilet 99 for the programmed time period, the valve 60 is placed in an off position so as to inhibit water from flowing into the toilet 99.

Step 315, the processing module 42 initiates a timeout period. The timeout period inhibits operation of the valve 60 and detection of occupancy for three hundred and sixty seconds. In step 317, ensuing lapse of the timeout period, the detection module 65 is enabled as well as the leak detection module 44 wherein the remote sensor 20 begins continuous monitoring for wet/dry conditions. Step 321, is an idle state wherein in the idle state, the detection module 65 and leak detection module 44 remain in an active state monitoring for presence of a user and detection of wet conditions. In step 323, the detection module 65 detects the presence of a user adjacent to the toilet 99. Step 325, the valve 60 is opened for the programmed time period to permit water to flow to the toilet 99. In step 327, the valve 60 is returned to its closed position. Step 329, the leak detection module 44 employing the at least one remote sensor 20 checks for wet conditions. If wet conditions are detected, the control assembly 10 initiates a visual and audial alarm and advancement to step 331 occurs wherein the user must facilitate the repair to the toilet 99 to address the leaking thereof. If no water is detected by the leak detection module 65, the user can utilize the toilet 99 as needed and proceed to step 333 wherein the detection module 65 is disabled. In step 335, the programmed timeout period is initiated by the processing module 42 for the programmed time period discussed herein. Step 337, the timeout period expires. In step 339 the detection module 65 is placed in its active position so as to initiate monitoring for the presence of a subsequent user of the toilet 99. Step 341, the remote sensor 20 is additionally placed in its active state so as to monitor for wet conditions. In step 343, the control assembly 10 is placed in its idle state awaiting for a user of the toilet 99, wherein in the idle state the detection module 65 and leak detection module 44 are actively monitoring for a user and wet conditions respectively.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for controlling water flow to a toilet and detecting leaks proximate thereto wherein the method comprises steps of:

providing a control assembly, said control assembly having a housing, said control assembly configured to be operably coupled to a water supply for a toilet, said control assembly having a valve, said valve operable to be moved intermediate an on position and an off position, said control assembly having a detection module configured to detect a presence of a user of a toilet, said control assembly having a processing module wherein the processing module has necessary electronics to receive, store, transmit and manipulate data, said control assembly further having a leak detection module;

installing the control assembly, wherein the control assembly is installed to the water supply for the toilet;

coupling at least one remote sensor to the control assembly, wherein the at least one remote sensor is communicably coupled to the control assembly;

placing the at least one remote sensor adjacent to the toilet;

activating the control assembly;

flushing the toilet;

placing the valve in an open position, wherein in the open position the valve permits water to flow to the toilet;

closing the valve, wherein closing the valve stops water flow to the toilet;

initiating a timeout period, wherein during the timeout period the processing module inhibits operation of the valve and detection module for a programmed time period;

enabling the at least one remote sensor, wherein subsequent expiration of the timeout period the at least one remote sensor is enabled;

monitoring for a user and for wet conditions, wherein the detection module continuously monitors for a user of the toilet and wherein the at least one remote sensor continuously monitors for wet conditions in an area adjacent to the toilet;

detecting a user, wherein the detection module detects presence of a user adjacent to the toilet;

opening the valve, wherein the valve is placed in an open position permitting water to flow to the toilet;

closing the valve, wherein the valve is placed in a closed position inhibiting water from flowing to the toilet;

utilizing the toilet, wherein the user uses the toilet;

initiating the timeout period, wherein during the timeout period the processing module inhibits operation of the valve and detection module for the programmed time period;

ending the timeout period;

enabling the at least one remote sensor;

monitoring for another user, wherein the detection module continuously monitors for another user of the toilet and wherein the at least one remote sensor continuously monitors for wet conditions in the area adjacent to the toilet.

2. The method for controlling water flow to the toilet and detecting leaks proximate thereto as recited in claim 1, and further including a step of detecting wet conditions in the area adjacent the toilet, wherein subsequent wet condition detection an alarm is transmitted to a user.

3. The method for controlling water flow to the toilet and detecting leaks proximate thereto as recited in claim 2, wherein the control assembly further includes a magnetic activation module.

4. The method for controlling water flow to the toilet and detecting leaks proximate thereto as recited in claim 3, wherein the programmed time for the timeout period is three hundred and sixty seconds.

5. The method for controlling water flow to the toilet and detecting leaks proximate thereto as recited in claim 4, wherein the valve is programmed to remain in the open position for a time range between thirty and sixty seconds.

6. The method for controlling water flow to the toilet and detecting leaks proximate thereto as recited in claim 5, wherein the control assembly further includes a power conditioner.

7. The method for controlling water flow to the toilet and detecting leaks proximate thereto as recited in claim 6, wherein the control assembly further includes an alarm module, said alarm module configured to emit audial and visual alarm upon detection of wet conditions by the at least one remote sensor.

8. The method for controlling water flow to the toilet and detecting leaks proximate thereto as recited in claim 7, and further including a step of inhibiting operation of the toilet, wherein subsequent detection of wet conditions by the at least one remote sensor the processing module inhibits operation of the valve inhibiting water flow to the toilet.

\*   \*   \*   \*   \*